United States Patent
Ikushima

(10) Patent No.: US 11,396,028 B2
(45) Date of Patent: *Jul. 26, 2022

(54) LIQUID MATERIAL APPLICATION APPARATUS AND LIQUID MATERIAL APPLICATION METHOD

(71) Applicant: MUSASHI ENGINEERING, INC., Mitaka (JP)

(72) Inventor: Kazumasa Ikushima, Tokyo (JP)

(73) Assignee: MUSASHI ENGINEERING, INC., Mitaka (JP)

( * ) Notice: Subject to any disclaimer, the term of this patent is extended or adjusted under 35 U.S.C. 154(b) by 7 days.

This patent is subject to a terminal disclaimer.

(21) Appl. No.: 16/903,789

(22) Filed: Jun. 17, 2020

(65) Prior Publication Data

US 2020/0353493 A1 Nov. 12, 2020

Related U.S. Application Data

(63) Continuation of application No. 16/066,834, filed as application No. PCT/JP2017/019623 on May 25, 2017, now Pat. No. 10,786,827.

(51) Int. Cl.
  *B05B 12/12* (2006.01)
  *B05B 13/04* (2006.01)
  *B05D 1/02* (2006.01)

(52) U.S. Cl.
  CPC ........ *B05B 12/126* (2013.01); *B05B 13/0431* (2013.01); *B05D 1/02* (2013.01)

(58) Field of Classification Search
  CPC .................................................. B05D 1/02
  See application file for complete search history.

(56) References Cited

U.S. PATENT DOCUMENTS

| 5,046,666 A | 9/1991 | Ono |
| 8,249,745 B2 | 8/2012 | Ikushima |

(Continued)

FOREIGN PATENT DOCUMENTS

| CN | 101907805 A | 12/2010 |
| CN | 103372522 A | 10/2013 |

(Continued)

OTHER PUBLICATIONS

Office Action dated Jun. 29, 2021, issued in counterpart JP application No. 2019-007484, with English translation. (4 pages).

(Continued)

*Primary Examiner* — Nathan T Leong
(74) *Attorney, Agent, or Firm* — WHDA, LLP

(57) ABSTRACT

Object: A liquid material application apparatus and a liquid material application method are provided with which a liquid material can be discharged in a predetermined discharge amount per unit time regardless of a relative moving speed in a series of application works.
Solution: The liquid material application apparatus includes a discharge head, a robot moving the discharge head relative to a workpiece, a movement control unit controlling relative movement of the discharge head and the workpiece, and a discharge control unit controlling an operation of discharging a liquid material from a discharge head, wherein the discharge control unit executes, in a switchable manner in accordance with an application program, first mode discharge control of changing a discharge amount of the liquid material, which is discharged from the discharge head per unit time, depending on a relative moving speed between the discharge head and the workpiece, and second mode discharge control of operating the discharge head to discharge the liquid material in a predetermined discharge amount per unit time regardless of the relative moving speed. The liquid (Continued)

material application method is implemented using the liquid material application apparatus.

10 Claims, 7 Drawing Sheets

(56) References Cited

U.S. PATENT DOCUMENTS

| | | | |
|---|---|---|---|
| 8,588,958 | B2 | 11/2013 | Ikushima |
| 8,703,601 | B2 | 4/2014 | Ikushima |
| 9,233,532 | B2 | 1/2016 | Qiu et al. |
| 9,952,602 | B2 | 4/2018 | Ikushima |
| 10,786,827 | B2 * | 9/2020 | Ikushima .................. B05C 5/00 |
| 2004/0081759 | A1 | 4/2004 | Maruyama et al. |
| 2010/0033529 | A1 * | 2/2010 | Komuro .................. B41J 29/02 347/16 |
| 2010/0057251 | A1 | 3/2010 | Ikushima |
| 2011/0184544 | A1 | 7/2011 | Ikushima |
| 2012/0298038 | A1 | 11/2012 | Ikushima |
| 2012/0313276 | A1 | 12/2012 | Ikushima |
| 2013/0284088 | A1 | 10/2013 | Takayama |
| 2014/0252041 | A1 | 9/2014 | Ikushima |
| 2015/0165761 | A1 | 6/2015 | Qiu et al. |
| 2016/0107188 | A1 | 4/2016 | Ikushima |
| 2016/0306364 | A1 * | 10/2016 | Ikushima .............. B05C 5/0225 |
| 2017/0225188 | A1 | 8/2017 | Ikushima |

FOREIGN PATENT DOCUMENTS

| | | |
|---|---|---|
| JP | 62-269771 A | 11/1987 |
| JP | 5-285434 A | 11/1993 |
| JP | 10-202161 A | 8/1998 |
| JP | 11-97484 A | 4/1999 |
| JP | 2000-308842 A | 11/2000 |
| JP | 2003-245596 A | 9/2003 |
| JP | 2004-158529 A | 6/2004 |
| JP | 2006-159161 A | 6/2006 |
| JP | 2007-245033 A | 9/2007 |
| JP | 2008-108988 A | 5/2008 |
| JP | 2009-39661 A | 2/2009 |
| JP | 2009-50828 A | 3/2009 |
| JP | 2009-98272 A | 5/2009 |
| JP | 2009-192828 A | 8/2009 |
| JP | 2010-17629 A | 1/2010 |
| JP | 2010-36560 A | 2/2010 |
| JP | 2010-284568 A | 12/2010 |
| JP | 2011-115688 A | 6/2011 |
| JP | 2011-235476 A | 11/2011 |
| JP | 2012-50968 A | 3/2012 |
| JP | 2014-24294 A | 2/2014 |
| JP | 2014-161836 A | 9/2014 |
| JP | 2016-30242 A | 3/2016 |
| KR | 10-2014-0074974 A | 6/2014 |
| WO | 2007/083585 A1 | 7/2007 |
| WO | 2009/031305 A1 | 3/2009 |
| WO | 2011/018988 A1 | 2/2011 |
| WO | 2015/083722 A1 | 6/2015 |

OTHER PUBLICATIONS

Decision to Grant a Patent dated Apr. 6, 2018, Issued in counterpart Japanese Patent Application No. 2018-513690, w/English translation (6 pages).
International Search Report dated Aug. 29, 2017, issued in counterpart application No. PCT/JP2017/019623. (3 pages).
Office Action dated Aug. 9, 2018, issued in counterpart Japanese Application No. 2018-106655. (4 pages).
The Third Party Observations dated Jul. 9, 2020, issued in counterpart DE Application No. 112017000685.6, with human English translation. (13 pages).
Office Action dated Mar. 10, 2021, issued in counterpart KR Application No. 10-2021-7003335, with English translation. (10 pages).
Office Action dated Sep. 24, 2021, issued in counterpart CN application No. 201780091187.2, with English Translation. (10 pages).

* cited by examiner

[Fig.1]
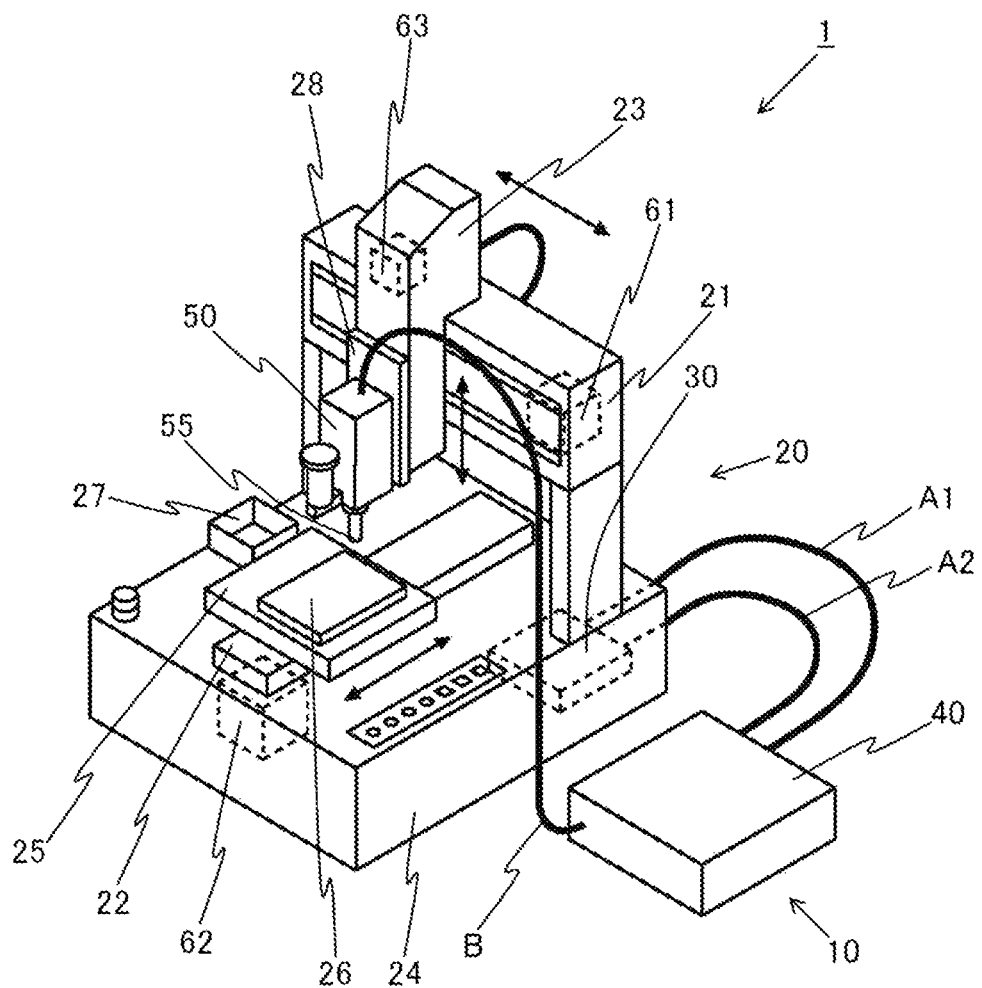

[Fig.2]
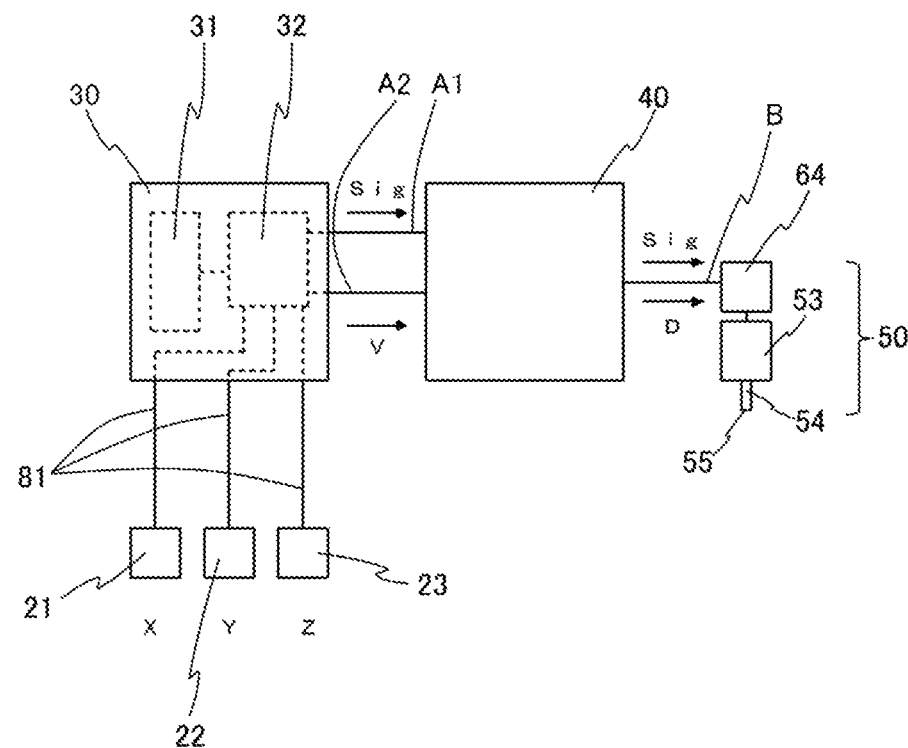
[Fig.3]
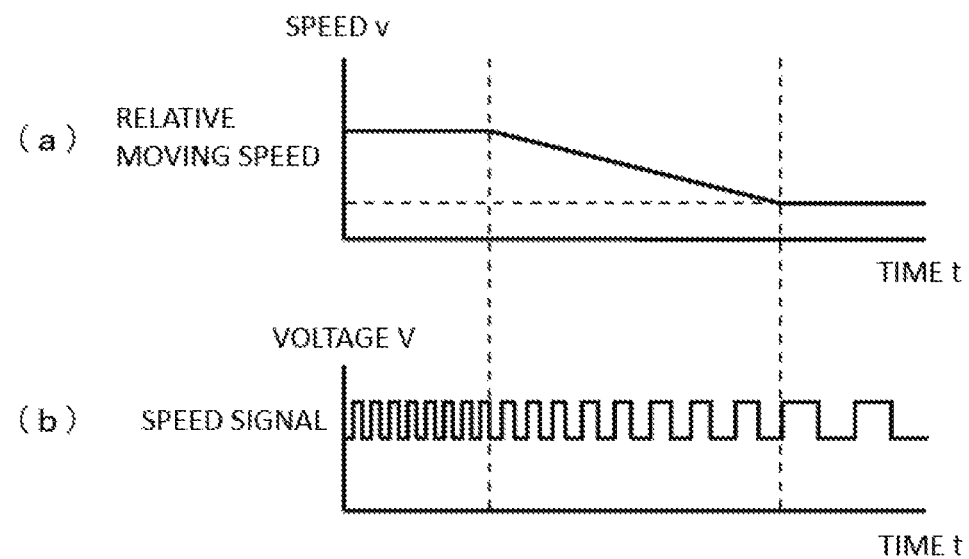

[Fig.4]
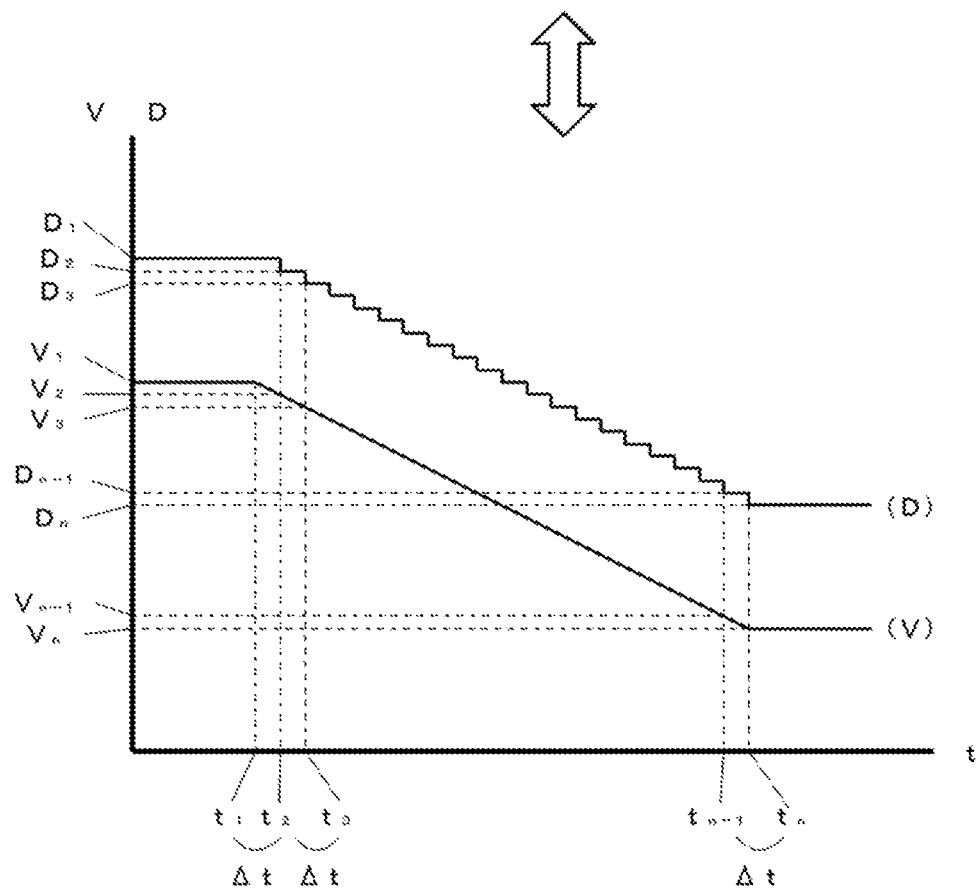

[Fig.5]
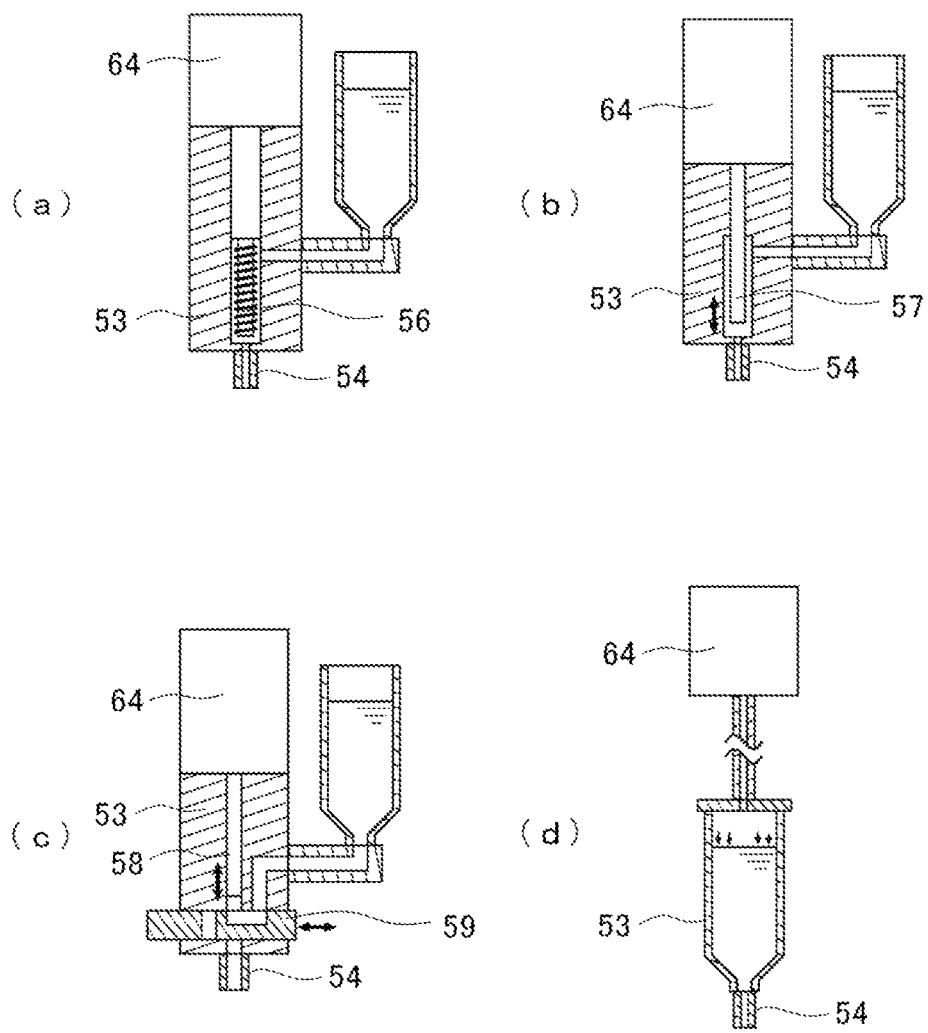

[Fig.6]
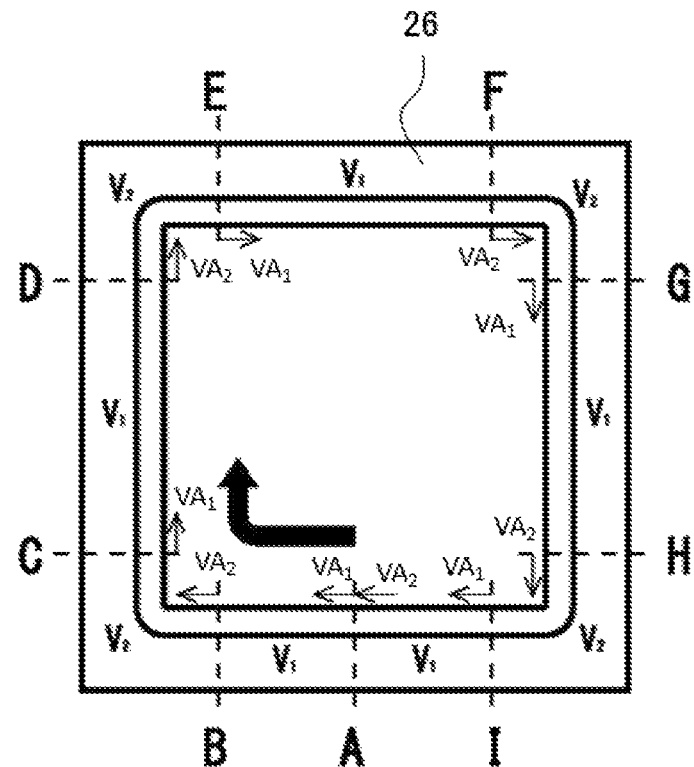
[Fig.7]
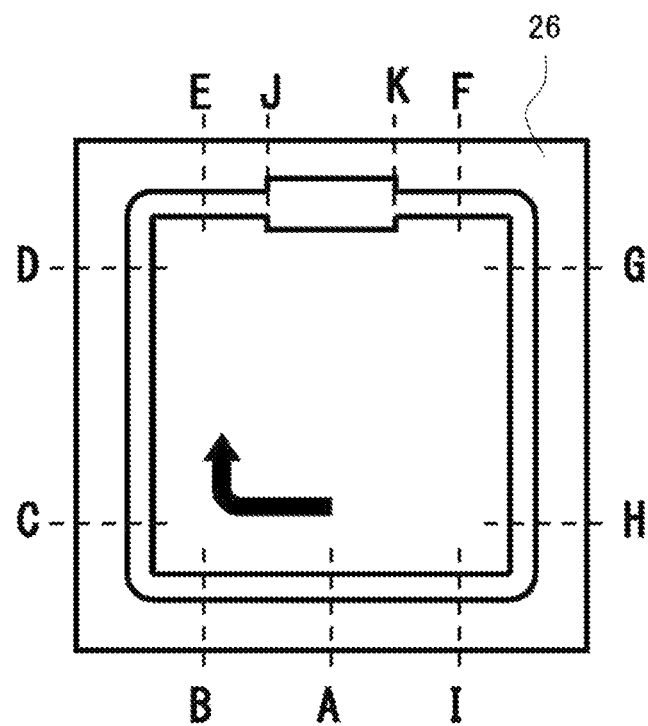

[Fig.8]
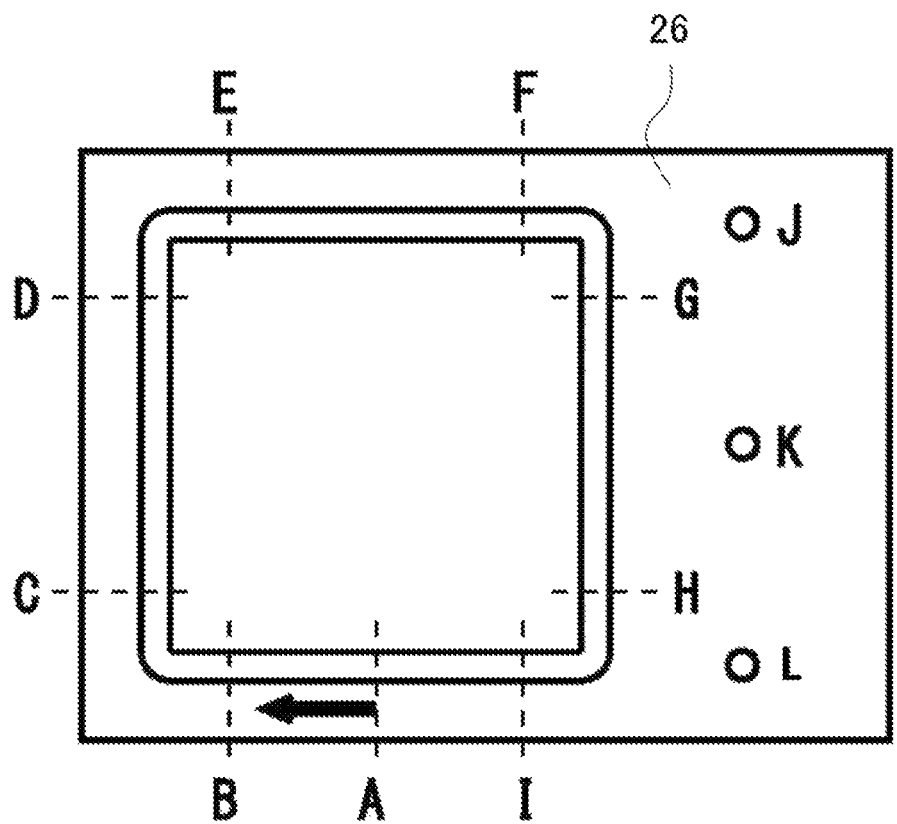
[Fig.9]
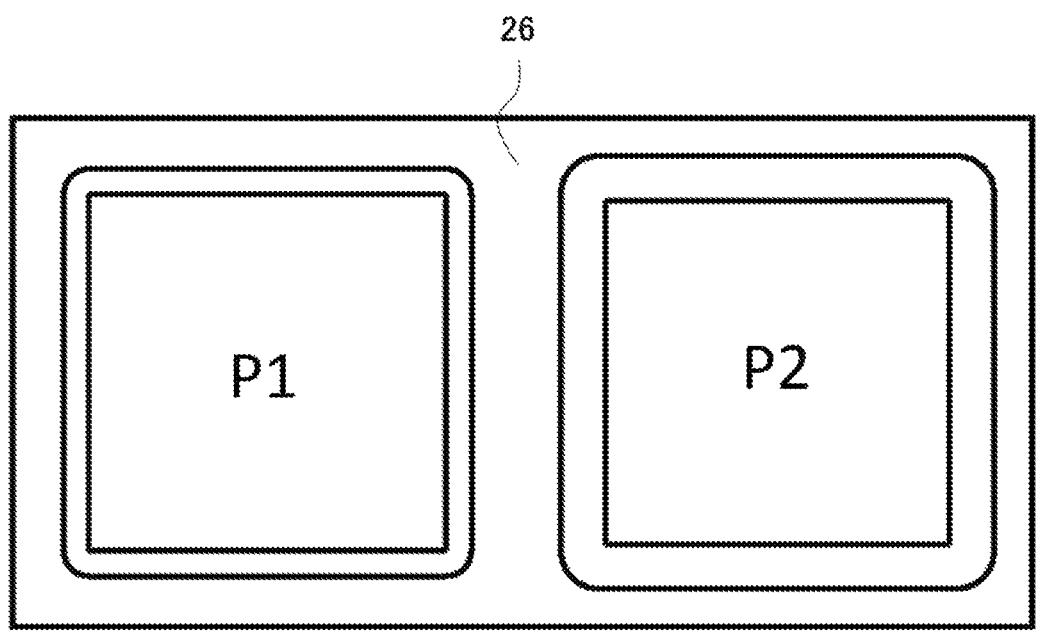

[Fig.10]
(A)
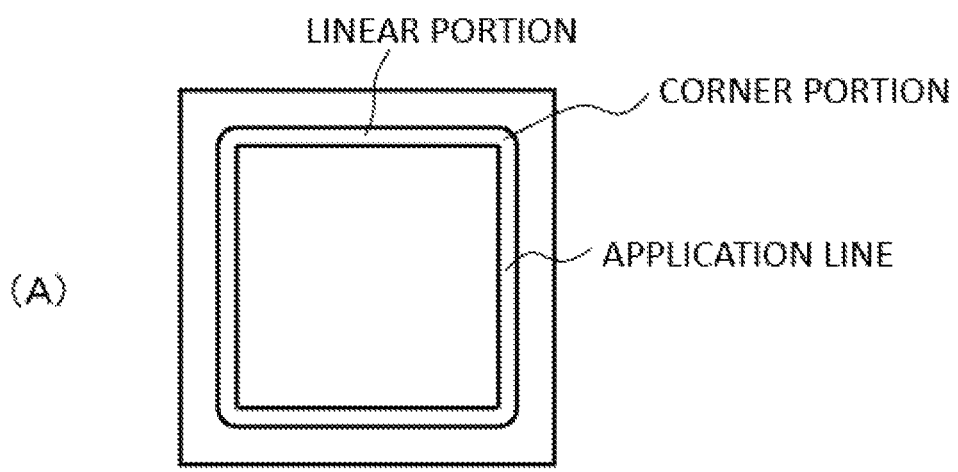
(B)
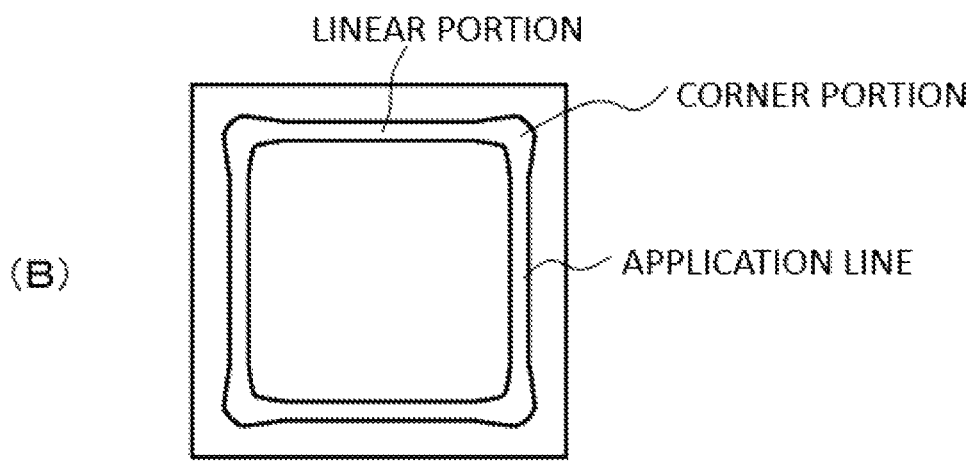

LIQUID MATERIAL APPLICATION APPARATUS AND LIQUID MATERIAL APPLICATION METHOD

This application is a continuation of U.S. application Ser. No. 16/066,834, filed on Jun. 28, 2018, which is a National Stage of International Application No. PCT/JP2017/019623, filed on May 25, 2017, which are hereby incorporated by reference.

TECHNICAL FIELD

The present invention relates to a liquid material application apparatus and a liquid material application method for use in performing a desired line drawing application (also broadly called a drawing application) on a workpiece while a discharge head and the workpiece are moved relative to each other.

BACKGROUND ART

A discharge device called a dispenser is used in many cases to apply a liquid material along a predetermined pattern in a process of manufacturing electronic devices. The dispenser is widely used in manufacturing various devices ranging from large-sized devices to small-sized devices. For instance, the dispenser is used in a step of linearly applying a phosphor or an adhesive onto a flat panel display represented by a liquid crystal or organic EL display, or in a step of linearly applying an adhesive for fixing a smartphone cover along an outer periphery of the cover.

Application work using the dispenser is performed by discharging a liquid material from the dispenser while the dispenser and a worktable are relatively moved in accordance with a predetermined application pattern. However, when a line drawing application is performed for the application pattern including a corner portion, a problem occurs in that a relative moving speed between the dispenser and the worktable is changed and a line width of a drawn application line varies in the corner portion (i.e., a problem that, in spite of desiring a line to be applied in the corner portion in the same width as that in a linear portion as illustrated in FIG. 10(A), the line in the corner portion becomes wider than in the linear portion as illustrated in FIG. 10(B) due to change of the relative moving speed between the dispenser and the worktable in the corner portion).

In consideration of the above problem, there has been proposed a technique of applying a proper amount of the liquid material in the corner portion by decelerating the relative moving speed between the dispenser and the worktable and reducing a discharge pressure of the dispenser at a start point of the corner portion, and then accelerating the relative moving speed between the dispenser and the worktable and increasing the discharge pressure of the dispenser before reaching an end point of the corner portion.

However, because the discharge pressure (discharge amount) is controlled in accordance with pattern data stored in a microcomputer, programming is needed with respect to the following points to realize the desired line drawing application in an application apparatus that includes, for example, a robot (XYZ-direction moving device) to relatively move the dispenser and the worktable.

Programming is first needed with respect to a relative movement command for relatively moving the dispenser and the worktable in accordance with the application pattern. Programming is further needed with respect to a discharge amount control command for controlling the discharge amount at each application position on the application pattern. The discharge amount control command is, for example, a command for weakening an air pressure for the discharge, shortening a distance between an annular valve seat in communication with a discharge port and a valve member, or reducing a rotation speed of a screw that gives a discharge propulsion force. Furthermore, in a place where the relative moving speed is changed as in the corner portion, it is needed to divide a locus of the line drawing in the corner portion into a plurality of parts, and to carry out programming with respect to each of the relative moving speed and the discharge pressure for each part of the divided locus.

Because the task of programming the discharge amount at each application position takes time and effort, there is proposed a technique of automatically controlling the discharge pressure (discharge amount) in accordance with the change of the relative moving speed between the dispenser and the worktable.

For example, Patent Document 1 discloses a technique of controlling a liquid amount applied to an object to be kept constant by opening a valve rod to increase a discharge flow rate when a linear moving speed of a liquid application apparatus body is high, and conversely by closing the valve rod to decrease the discharge flow rate when the linear moving speed of the liquid application apparatus body is low.

Furthermore, Patent Document 2 discloses a technique of preparing, in a conversion unit, a relational expression or a conversion table representing a relation between a moving speed of a dispense head and a control amount of a discharge amount control device, and calculating the control amount to realize a preset line width by putting the moving speed into the relational expression or the conversion table.

CITATION LIST

Patent Documents

Patent Document 1: Japanese Patent Laid-Open Publication No. H05-285434
Patent Document 2: International Publication No. 2015/083722

SUMMARY OF INVENTION

Technical Problem

In the related-art techniques (inventions disclosed in Patent Documents 1 and 2), however, the discharge amount of the liquid material per unit time discharged from the dispenser is determined on the basis of the relative moving speed between the dispenser and the worktable. Thus, in order to discharge the liquid material in a discharge amount desired by an operator, the dispenser and the worktable need to be relatively moved at the relative moving speed corresponding to the desired discharge amount. Accordingly, even in the case of performing dumping discharge or trial discharge during application work, the dispenser and the worktable need to be continuously moved over a dumping discharge area or a trial discharge area at the relative moving speed corresponding to the discharge amount desired by the operator.

Furthermore, in the related-art techniques, a relation between the relative moving speed between the dispenser and the worktable and the discharge amount per unit time needs to be set depending on a line width desired by the operator such that an application line with a constant line width is drawn even when the relative moving speed between the dispenser and the worktable is changed. Therefore, in the case of drawing application lines with different line widths in a series of application works, the relation between the relative moving speed and the discharge amount per unit time needs to be set for each of the line widths desired by the operator. This leads to a problem of requiring the laborious task.

The related-art techniques further have a problem that work of applying the liquid material in the form of a spot by stopping the dispenser cannot be performed.

An object of the present invention is to provide a liquid material application apparatus and a liquid material application method capable of discharging a liquid material in a predetermined discharge amount per unit time regardless of a relative moving speed during a series of application works.

Solution to Problem

The present invention provides a liquid material application apparatus comprising a discharge head discharging a liquid material, a robot moving the discharge head relative to a workpiece, a movement control unit controlling relative movement of the discharge head and the workpiece in accordance with an application program, and a discharge control unit controlling an operation of discharging the liquid material from the discharge head, the movement control unit and the discharge control unit cooperatively performing work of applying the liquid material onto the workpiece in a predetermined application pattern, wherein the discharge control unit executes, in a switchable manner in accordance with the application program, first mode discharge control of changing a discharge amount of the liquid material, which is discharged from the discharge head per unit time, depending on a relative moving speed between the discharge head and the workpiece, and second mode discharge control of operating the discharge head to discharge the liquid material in a predetermined discharge amount per unit time regardless of the relative moving speed.

In the liquid material application apparatus described above, in the first mode discharge control, a line drawing application of drawing an application line in a constant application amount per unit length may be performed in accordance with the application program.

In the liquid material application apparatus described above, in the first mode discharge control, a line drawing application of drawing an application line in a constant line width may be performed in accordance with the application program.

In the liquid material application apparatus described above, in the second mode discharge control, at least one among the line drawing application, a dumping application, a trial application, and a spot application may be performed in accordance with the application program. As an alternative, at least two among the line drawing application, the dumping application, the trial application, and the spot application may be performed.

In the liquid material application apparatus described above, the discharge control unit may switch over the first mode discharge control and the second mode discharge control upon receiving a signal output from the movement control unit in accordance with the application program.

In the liquid material application apparatus described above, the discharge control unit may be able to set plural types of the first mode discharge control in which relations between the relative moving speed and the discharge amount per unit time are different from one another, and plural types of the second mode discharge control in which the predetermined discharge amounts per unit time are different from one another, and to selectively execute one among the plural types of the first mode discharge control and the plural types of the second mode discharge control.

In the liquid material application apparatus described above, the discharge control unit may have a function of automatically calculating, on the basis of a first relative moving speed, a first discharge amount per unit time corresponding to the first relative moving speed, a second relative moving speed, and a second discharge amount per unit time corresponding to the second relative moving speed, a third discharge amount per unit time corresponding to a third relative moving speed, and in the first mode discharge control, the discharge control unit may control the discharge head in a manner of, while moving the discharge head at one of the first to third relative moving speeds, discharging the liquid material in the discharge amount per unit time corresponding to the one relative moving speed from the discharge head.

In the liquid material application apparatus described above, the relative moving speeds may include, in addition to relative moving speeds previously input to the application program to apply the liquid material in the application pattern, a relative moving speed automatically calculated on the basis of the relative moving speeds previously input to the application program to complement the relative moving speeds previously input to the application program.

The present invention further provides a liquid material application method using a liquid material application apparatus that comprises a discharge head discharging a liquid material, a robot moving the discharge head relative to a workpiece, a movement control unit controlling relative movement of the discharge head and the workpiece in accordance with an application program, and a discharge control unit controlling an operation of discharging the liquid material from the discharge head, the movement control unit and the discharge control unit cooperatively performing work of applying the liquid material onto the workpiece in a predetermined application pattern, wherein first mode discharge control of changing a discharge amount of the liquid material, which is discharged from the discharge head per unit time, depending on a relative moving speed between the discharge head and the workpiece, and second mode discharge control of operating the discharge head to discharge the liquid material in a predetermined discharge amount per unit time regardless of the relative moving speed are executed in a switchable manner in accordance with the application program.

In the liquid material application method described above, in the first mode discharge control, a line drawing application of drawing an application line in a constant application amount per unit length may be performed in accordance with the application program.

In the liquid material application method described above, in the first mode discharge control, a line drawing application of drawing an application line in a constant line width may be performed in accordance with the application program.

In the liquid material application method described above, in the second mode discharge control, at least one among the line drawing application, a dumping application, a trial application, and a spot application may be performed in accordance with the application program. As an alternative, at least two among the line drawing application, the dumping application, the trial application, and the spot application may be performed.

In the liquid material application method described above, the discharge control unit may switch over the first mode discharge control and the second mode discharge control upon receiving a signal output from the movement control unit in accordance with the application program.

In the liquid material application method described above, the discharge control unit may set plural types of the first mode discharge control in which relations between the relative moving speed and the discharge amount per unit time are different from one another, and plural types of the second mode discharge control in which the predetermined discharge amounts per unit time are different from one another, and may selectively execute one among the plural types of the first mode discharge control and the plural types of the second mode discharge control.

In the liquid material application method described above, the discharge control unit may have a function of automatically calculating, on the basis of a first relative moving speed, a first discharge amount per unit time corresponding to the first relative moving speed, a second relative moving speed, and a second discharge amount per unit time corresponding to the second relative moving speed, a third discharge amount per unit time corresponding to a third relative moving speed, and in the first mode discharge control, the discharge control unit may control the discharge head in a manner of, while moving the discharge head at one of the first to third relative moving speeds, discharging the liquid material in the discharge amount per unit time corresponding to the one relative moving speed from the discharge head.

In the liquid material application method described above, the relative moving speeds may include, in addition to relative moving speeds previously input to the application program to apply the liquid material in the application pattern, a relative moving speed automatically calculated on the basis of the relative moving speeds previously input to the application program to complement the relative moving speeds previously input to the application program.

In the liquid material application method described above, the first mode discharge control may be executed when performing a line drawing application in which the relative moving speed is changed depending on the application pattern, and the second mode discharge control may be executed when performing a line drawing application at a constant relative moving speed.

In the liquid material application method described above, the workpiece may be prepared as one or more semiconductor chips, one or more substrates each including one semiconductor chip mounted thereto, or one or more substrates each including a plurality of semiconductor chips mounted thereto.

Advantageous Effect of Invention

According to the present invention, the first mode discharge control of changing the discharge amount per unit time of the liquid material, which is discharged from the discharge head, depending on the relative moving speed between the discharge head and the workpiece and the second mode discharge control of operating the discharge head to discharge the liquid material in a predetermined discharge amount per unit time regardless of the relative moving speed can be executed in a switchable manner in accordance with the application program. Hence application work can be properly performed while laborious task for programming to be prepared by an operator is reduced.

BRIEF DESCRIPTION OF THE DRAWINGS

FIG. 1 is a perspective view illustrating an external appearance of an application apparatus according to the present invention.

FIG. 2 is a block diagram illustrating a control unit and associated elements.

FIG. 3 depicts graphs representing a relation between a speed signal and a relative moving speed.

FIG. 4 is an illustration referenced to explain a control example of a discharge amount.

FIG. 5 is an illustration referenced to explain discharge types of a dispenser.

FIG. 6 is an illustration referenced to explain an application operation for a series of application works in which a line drawing application for an application pattern including corner portions and a dumping application are performed alternately.

FIG. 7 is an illustration referenced to explain an application operation for a series of application works in which a line width of an application line is changed in a linear portion of a predetermined application pattern.

FIG. 8 is an illustration referenced to explain an application operation in a series of application works in which a line drawing application for a predetermined application pattern and a spot application are performed alternately.

FIG. 9 is an illustration referenced to explain an application operation for a series of application works in which a pair of a line drawing application for a predetermined application pattern and a dumping application, and a pair of a line drawing application for a second application pattern having a different line width from that of the predetermined application pattern and the dumping application are performed alternately.

FIG. 10 illustrates an example of a line drawing application by an application apparatus of related art.

DESCRIPTION OF EMBODIMENTS

An embodiment of the present invention will be described below with reference to the drawings.

The embodiment is disclosed here in connection with discharge control to realize uniformity in line width when viewing an application line from above, the application line being an example of application lines in which an application amount per unit length is constant, but the technical concept of the present invention is not limited to the case of realizing uniformity in line width. In order to realize discharge control to keep constant the application amount per unit length, the discharge control may be performed aiming at uniformity in height, uniformity in both line width and height, or uniformity in cross-sectional area of the application line, for example.

<Application Apparatus>

FIG. 1 is a perspective view illustrating an external appearance of an application apparatus according to the present invention. FIG. 2 is a block diagram illustrating a control unit and associated elements. As illustrated in FIG. 1, an application apparatus 1 according to the present invention includes, as main components, a dispenser 10 and a robot 20. The dispenser 10 includes a dispense head 50 and a dispense controller 40. As illustrated in FIG. 1, the robot 20 and the dispense controller 40 are electrically connected to each other via cables A1 and A2. The dispense head 50 and the dispense controller 40 are electrically connected to each other via a cable B.

<Robot>

The robot 20 is a desktop device including an X-axis moving device 21, a Y-axis moving device 22, a robot head 23, a base 24, and a robot controller 30.

The X-axis moving device 21 is supported by two posts and includes an X-axis driving source 61 as a driving source. The robot head 23 is mounted to the X-axis moving device 21 such that the robot head 23 is movable to any desired coordinate in an X direction.

The Y-axis moving device 22 is installed on the base 24 and includes a Y-axis driving source 62 as a driving source. A worktable 25, i.e., a workpiece holder, is mounted to the Y-axis moving device 22 such that the worktable 25 is movable to any desired coordinate in a Y direction. A workpiece 26 is detachably held on a placement surface of the worktable 25.

The robot head 23 includes a moving member 28 and a Z-axis driving source 63, and constitutes a Z-axis moving device in which the Z-axis driving source 63 serves as a driving source. Thus, in the robot head 23, the moving member 28 is movable to any desired coordinate in a Z direction by the Z-axis driving source 63. The dispense head 50 is detachably fixed to the moving member 28 constituted with a plate such that the dispense head 50 is also movable to any desired coordinate in the Z direction by the robot head 23 (Z-axis moving device).

The driving sources 61 to 63 are not limited to particular ones, and they may be constituted by stepping motors, servomotors, or linear motors, for example.

At a position in an upper surface of the base 24 to which the dispense head 50 can be moved, the base 24 includes a dumping discharge area (adjustment application area) 27 where a liquid material is dumped, for example. The robot controller 30 for controlling operation of the robot 20 is incorporated in the base 24. As illustrated in FIG. 2, the robot controller 30 includes a storage device 31 in which an application program is stored, and a computing device 32 for executing the application program stored in the storage device 31. Furthermore, as illustrated in FIG. 2, the robot controller 30 is electrically connected to the X-axis moving device 21, the Y-axis moving device 22, and the Z-axis moving device 23 via cables 81.

The application program stored in the robot controller 30 describes not only relative movement commands including commands for moving the XYZ-axis moving devices (21 to 23) to designated coordinates along linear or curved paths, and a command for instructing a relative moving speed between the dispense head 50 and the worktable 25 (or the workpiece 26), but also a discharge start command for making the dispenser 10 start discharge of the liquid material, a discharge end command for making the dispenser 10 bring the discharge of the liquid material to an end, and a command for setting a discharge control mode of the dispenser 10. In accordance with the application program, the robot controller 30 can transmit the relative movement commands to the X-axis moving device 21, the Y-axis moving device 22, and the Z-axis moving device 23, and can move the dispense head 50 and the worktable 25 relative to each other. A command regarding a discharge amount of the liquid material discharged from the dispense head 50 is not described in the application program, and it is described in a discharge control program stored in the dispense controller 40. Commands for controlling timing to make the discharge control program execute first mode discharge control and timing to make the discharge control program execute second mode discharge control are described in the application program.

In accordance with the application program, the robot controller 30 moves the dispense head 50 and the worktable 25 relative to each other in two types of movement, i.e., PTP movement and interpolation movement. The PTP movement is an operation of relatively moving the dispense head 50 to designated coordinates on the workpiece 26 regardless of a path. The PTP movement is executed, for example, in the case of not discharging the liquid material, such as relative movement to an application start point or relative movement in return to the origin. The interpolation movement is an operation of relatively moving the dispense head 50 along a predetermined movement path at a predetermined relative moving speed. The interpolation movement is used, for example, in the case of applying the liquid material in accordance with a predetermined application pattern.

The robot controller 30 and the dispense controller 40 are electrically connected via the cables A1 and A2 as illustrated in FIG. 2. The robot controller 30 outputs signals, such as the discharge start command and the discharge end command, to the dispense controller 40 via the cable A1. The robot controller 30 further outputs a relative moving speed V between the dispense head 50 and the worktable 25 to the dispense controller 40 via the cable A2. During a period in which the dispense head 50 is under the interpolation movement, the robot controller 30 continuously outputs the relative moving speed V between the dispense head 50 and the worktable 25 to the dispense controller 40 via the cable A2.

FIG. 3 depicts graphs representing a relation between the relative moving speed V, denoted in (a), between the dispense head 50 and the worktable 25 and a speed signal, denoted in (b), output from the robot controller 30 to the dispense controller 40. As seen from FIG. 3, the speed signal is a pulse-shaped signal in which two large and small voltage values are alternately changed from one to the other. Moreover, in this embodiment, a period of the speed signal represents a value of the relative moving speed V as seen from FIG. 3. Thus, the relative moving speed V increases at a shorter period of the speed signal. The relation between the speed signal and the relative moving speed V is not limited to the above-described relation. In another example, the relative moving speed V may increase at a longer period of the speed signal, or the relative moving speed V may be changed depending on a level (magnitude) of the voltage value. In this embodiment, the above-described speed signal is continuously output from the robot controller 30 to the dispense controller 40 during the interpolation movement.

The term "relative moving speed" used in this embodiment means, rather than a moving speed for each of movement axes (i.e., an X movement axis, a Y movement axis, and a Z movement axis) of the robot 20, a relative moving speed synthesized from three moving speeds along the X movement axis, the Y movement axis, and the Z movement axis (this is similarly applied to the following description). The moving speed in the movement axis, which hardly affects the formation of an application line in a constant application amount per unit length, may be excluded as required.

The application program in this embodiment can be processed with an interpreter, but the present invention is not limited to such a case. Moreover, the operator may set a new application program in the storage device 31 of the robot controller 30, or change the application program stored in the robot controller 30 by using a computer equipped in the application apparatus 1 or a computer outside the application apparatus 1.

The robot 20 is not limited to the above-described structure insofar as enabling the dispense head 50 and the worktable 25 (or the workpiece 26) to be relatively moved in at least one-dimensional direction, preferably in two or more dimensional directions. As an alternative, the robot 20 may have an robot arm having one or more articulations equipped with the robot head 23, or a structure in which only the dispense head 50 can be moved, or a structure in which only the worktable 25 (or the workpiece 26) can be moved, instead of making both the dispense head 50 and the worktable 25 movable. Furthermore, while the embodiment has been described, by way of example, in connection with the case of performing the application with the workpiece 26 placed on the worktable 25, the present invention is not limited to that case. In another example, the application may be performed on the workpiece 26 by using a workpiece holder that holds the workpiece 26 at both edges in a sandwiching manner. Alternatively, the application may be performed on a workpiece that is being moved by a workpiece holder (e.g., a belt conveyor) prepared separately from the robot 20, or that is in a temporarily stopped state. In such a case, the robot 20 does not have any means for holding the workpiece, and it moves the dispense head 50 relative to the workpiece held on the workpiece holder disposed outside the robot.

While the embodiment has been described, by way of example, in connection with the configuration in which the cables A1 and A2 are each one separate cable, the cables A1 and A2 may be combined into one cable, or may be divided into three or more cables.

<Dispense Head>

As illustrated in FIG. 2, the dispense head 50 includes a discharge unit 53, a nozzle 54, and a discharge driver 64. The liquid material to be discharged from the nozzle 54 is reserved in the discharge unit 53. Though described in detail later, the discharge driver 64 is a driver for discharging the liquid material stored in the discharge unit 53 (e.g., an actuator for driving a screw or a plunger disposed in the discharge unit 53, or an air supply device for adjusting air pressure in the discharge unit 53). A driving amount of the driver is controllable. As illustrated in FIG. 2, the discharge driver 64 is connected to the dispense controller 40 via the cable B, and receives a discharge control amount D corresponding to the driving amount of the discharge driver 64 from the dispense controller 40. The discharge control amount D can be programmed by the operator. The discharge driver 64 is operated in accordance with the received discharge control amount D, and is able to discharge, from a discharge port 55 of the nozzle 54, the liquid material in the discharge amount per unit time desired by the operator.

<Dispense Controller>

The dispense controller 40 includes a storage device in which the discharge control program for controlling the discharge amount of the liquid material discharged from the dispense head 50 is stored, and a computing device for executing the discharge control program. The dispense controller 40 is detachably connected to the dispense head 50 and the robot controller 30. More specifically, the dispense controller 40 is electrically connected to the robot controller 30 via the cables A1 and A2, and is electrically connected to the dispense head 50 via the cable B.

The dispense controller 40 transmits discharge operation commands to the dispense head 50 via the cable B. The discharge operation commands include a discharge start command, a discharge end command, and a discharge amount control command. In this embodiment, the robot controller 30 transmits the discharge start command, the discharge end command, and a command for setting the discharge control mode to the dispense controller 40 in accordance with the application program. The dispense controller 40 can start or stop the operation of discharging the liquid material by the dispense head 50 by outputting the discharge start command or the discharge end command, which has been received from the robot controller 30, to the dispense head 50. Upon receiving the discharge operation command and the discharge control mode from the robot controller 30, though described in detail later, the dispense controller 40 determines the discharge control amount D in accordance with the discharge control program, and outputs the determined discharge control amount D to the discharge driver 64. As a result, the dispense controller 40 can operate the discharge driver 64 in accordance with the discharge control amount D, and can discharge, from the nozzle 54, the liquid material in the discharge amount per unit time desired by the operator.

The dispense head 50 and the dispense controller 40 can be replaced for each method of discharging the liquid material. In other words, for each method of discharging the liquid material, a discharge mechanism of the dispense head 50 is different and a value of the discharge control amount D instructed from the dispense controller 40 is changed because the discharge mechanism is different. The operator can make the application apparatus 1 perform the discharge operation in the desired discharge method by mounting the dispense head 50 and the dispense controller 40 corresponding to the desired discharge method. In the following, the method of discharging the liquid material by the dispenser 10 will be described regarding a screw type, a jet type, a plunger type, and an air type, for example, with reference to FIG. 5. It is to be noted that the method of discharging the liquid material by the dispenser 10 is not limited to the above-mentioned types.

(a) Screw Type

FIG. 5(*a*) is a partial sectional view of the dispense head 50 of the screw type. In the dispense head 50 of the screw type, a screw 56 is disposed in a flow passage of the discharge unit 53. With rotation of the screw 56, the liquid material can be supplied to the nozzle 54 and can be continuously discharged from the discharge port 55 of the nozzle 54. The dispense head 50 of the screw type may include the screw 56 in two or more axes, or an inner wall of the flow passage and the screw 56 on which special work are carried out, such as the so-called mohno type or uniaxial eccentric screw pump in which a single-thread screw eccentrically rotates inside a sleeve in the form of a double-thread screw.

The discharge amount of the liquid material discharged per unit time from the dispense head 50 of the screw type is controlled in accordance with the number of rotations of the screw 56 per unit time, and the number of rotations of the screw 56 per unit time is controlled in accordance with the number of rotations of a rotary actuator for rotating the screw 56. In order to discharge the liquid material in the desired discharge amount per unit time from the dispense head 50, therefore, the operator sets, in the dispense controller 40 for the screw type, the discharge control program that describes the discharge control amount D for directly or indirectly controlling the number of rotations of the rotary actuator per unit time.

When causing the dispenser 10 to perform the discharge operation of the screw type, the operator mounts the dispense head 50 and the dispense controller 40 both adapted for the screw type to the application apparatus 1. In such a state, the dispense controller 40 can discharge the liquid material in the discharge amount per unit time desired by the operator from the dispense head 50 in accordance with the screw-type method by transmitting the discharge control amount D described in the discharge control program to the discharge driver 64, and by rotating the rotary actuator, i.e., the discharge driver 64, in accordance with the discharge control amount D. A mechanism using a motor is mainly used for the rotary actuator, but the rotary actuator is not limited to such a mechanism.

(b) Jet Type

FIG. 5(*b*) is a partial sectional view of the dispense head 50 of the jet type. In the dispense head 50 of the jet type, a plunger 57 is disposed in a liquid chamber communicating with the discharge port 55 of the nozzle 54 in a state not contacting a side wall of the liquid chamber or partly contacting the side wall, but not impeding flow of the liquid material. The liquid material can be discharged to fly in the form of droplets from the discharge port 55 of the nozzle 54 by advancing the plunger 57 at a high speed and giving inertial force to the liquid material. The dispense head 50 of the jet type is classified into a type (seating type) in which the droplets are formed by bringing a tip of the plunger 57 into contact with a valve seat, and a type (not-seating type) in which the droplets are formed by not bringing the tip of the plunger 57 into contact with the valve seat.

The discharge amount discharged per unit time from the dispense head 50 of the jet type is controlled in accordance with the number of times of advancing and retracting the plunger per unit time, and the number of times of advancing and retracting the plunger 57 per unit time is controlled in accordance with the number of times of advancing and retracting an advancement/retraction actuator per unit time. In order to discharge the liquid material in the desired discharge amount per unit time from the dispense head 50, therefore, the operator sets, in the dispense controller 40 for the jet type, the discharge control program that describes the discharge control amount D for directly or indirectly controlling the number of times of advancing and retracting the advancement/retraction actuator per unit time.

When causing the dispenser 10 to perform the discharge operation of the jet type, the operator mounts the dispense head 50 and the dispense controller 40 both adapted for the jet type to the application apparatus 1. Thus, the dispense controller 40 can discharge the liquid material in the discharge amount per unit time desired by the operator from the dispense head 50 in accordance with the jet-type method by transmitting the discharge control amount D described in the discharge control program to the discharge driver 64, and by advancing and retracting the advancement/retraction actuator, i.e., the discharge driver 64, in accordance with the discharge control amount D. The advancement/retraction actuator is not limited to particular one, and may have a mechanism of driving a piston disposed on the back of the plunger 57 with the aid of air or a spring, or a mechanism of advancing and retracting the plunger 57 with the aid of an electromagnet.

(b) Plunger Type

FIG. 5(*c*) is a partial sectional view of the dispense head 50 of the plunger type. In the dispense head 50 of the plunger type, a plunger 58 is disposed in a metering portion communicating with the nozzle 54 to be slidable along a side wall of the metering portion. The liquid material can be discharged from the discharge port 55 of the nozzle 54 by advancing the plunger 58. A valve 59 for communicating the metering portion in which the plunger 58 is disposed with the liquid chamber or the discharge port 55 in a switchable manner may be disposed as required. The valve 59 can be operated for switching by a valve actuator (not illustrated).

The discharge amount discharged per unit time from the dispense head 50 of the plunger type is controlled in accordance with an advance amount of the plunger 58 per unit time, and the advance amount of the plunger 58 per unit time is controlled in accordance with the number of rotations per unit time of a discharge motor for reciprocally moving the plunger 58 in the metering pipe. In order to discharge the liquid material in the desired discharge amount per unit time from the dispense head 50, therefore, the operator sets, in the dispense controller 40 for the plunger type, the discharge control program that describes the discharge control amount D for directly or indirectly controlling the number of rotations of the discharge motor per unit time.

When causing the dispenser 10 to perform the discharge operation of the plunger type, the operator mounts the dispense head 50 and the dispense controller 40 both adapted for the plunger type to the application apparatus 1. In such a state, the dispense controller 40 can discharge the liquid material in the discharge amount per unit time desired by the operator from the dispense head 50 in accordance with the plunger-type method by transmitting the discharge control amount D described in the discharge control program to the discharge driver 64, and by rotating the discharge motor, i.e., the discharge driver 64, to advance the plunger 58 in accordance with the discharge control amount D. The rotation of the discharge motor can be converted to advancing and retracting movements of the plunger 58 with, for example, a mechanism of rotating a ball screw by a motor and of advancing and retracting a nut meshed with the ball screw. However, the present invention is not limited to such a mechanism. As an alternative, the advance amount of the plunger 58 per unit time may be controlled by using an advancement/retraction actuator other than the discharge motor, and by controlling the advance amount of the plunger 58 per unit time through control of an advance amount of the advancement/retraction actuator per unit time.

(d) Air Type

FIG. 5(*d*) is a partial sectional view of the dispense head 50 of the air type. In the dispense head 50 of the air type, the liquid material can be discharged from the discharge port 55 by supplying pressurized air to the liquid material in a liquid chamber communicating with the nozzle 54. An interposition member (float), also called a plunger, may be interposed between the liquid material and air. The discharge amount discharged per unit time from the dispense head 50 of the air type can be controlled with an air supply pressure of an air supply device. In order to discharge the liquid material in the desired discharge amount per unit time from the dispense head 50, therefore, the operator sets, in the dispense controller 40 for the air type, the discharge control program that describes the discharge control amount D for directly or indirectly controlling the air supply pressure of an air supply device.

When causing the dispenser 10 to perform the discharge operation of the air type, the operator mounts the dispense head 50 and the dispense controller 40 both adapted for the air type to the application apparatus 1. In such a state, the dispense controller 40 can discharge the liquid material in the discharge amount per unit time desired by the operator from the dispense head 50 in accordance with the air-type method by transmitting the discharge control amount D described in the discharge control program to the discharge driver 64, and by increasing and decreasing the air supply pressure of the air supply device, i.e., the discharge driver 64, in accordance with the discharge control amount D. The air supply device is not limited to particular one, and it may be constituted using a pressure reducing valve, for example.

The dispenser 10 is not limited to any of the above-described discharge types. If a discharge method is of the type discharging the liquid material from the discharge port 55 of the nozzle 54 and being able to control the discharge amount per unit time, the liquid material can be discharged in accordance with the relevant discharge method by using the dispenser 10 adapted for the relevant discharge method. Furthermore, in some examples of the dispense head 50, the nozzle 54 having the discharge port 55 may be constituted separately from the discharge driver 64 for discharging the liquid material. In such an example, the dispense head 50 is required to include at least the nozzle 54 having the discharge port 55. Stated in another way, a "discharge head" defined in this Description is just required to include a member having the nozzle 54 although the discharge head preferably includes a driver such as an actuator. In some cases, the timing of needing a relative moving speed signal transmitted from the robot controller 30 is different due to a difference of the discharge type of the dispense head 50 and the dispense controller 40. However, by providing the relative moving speed signal to be output from the robot controller 30 as a signal continuously output during the interpolation movement as described above, the relative moving speed signal can be obtained at the required timing without a delay regardless of the difference in the discharge type of the dispense controller 40.

Moreover, the dispense controller 40 is able to perform, even in the same discharge type, the discharge control in two different discharge modes, i.e., first mode discharge control and second mode discharge control. The first mode discharge control is a discharge control mode used when performing a line drawing application. More specifically, the first mode discharge control is a discharge control mode in which the discharge amount of the liquid material per unit time is changed in accordance with the relative moving speed V between the dispense head 50 and the worktable 25 particularly in the corner portion of the predetermined application pattern for the purpose of suppressing variation in the application amount per unit length of the application line, the variation being caused due to change of the relative moving speed between the dispense head 50 and the worktable 25. The second mode discharge control is a discharge control mode for performing dumping discharge, trial discharge, or a spot application, for example. In other words, the second mode discharge control is a discharge control mode in which the dispense head 50 is instructed to discharge the liquid material in the predetermined discharge amount per unit time regardless of the relative moving speed V between the dispense head 50 and the worktable 25.

<First Mode Discharge Control>

In order to perform the first mode discharge control, the dispense controller 40 includes a relational expression or a conversion table representing a relation between the relative moving speed V and the discharge control amount D of the discharge driver 64. The relational expression or the conversion table representing the relation between the relative moving speed V and the discharge control amount D of the discharge driver 64 is prepared to set in advance the relation between the relative moving speed V and the discharge control amount D of the discharge driver 64 such that the application line having the line width desired by the operator can be drawn by the line drawing application. In the case of performing the first mode discharge control, the dispense controller 40 receives the speed signal corresponding to the relative moving speed V between the dispense head 50 and the worktable 25 from the robot controller 30 via the cable A2. Then, the dispense controller 40 calculates the relative moving speed V on the basis of the received speed signal, and puts the calculated relative moving speed V into the relational expression or the conversion table, thereby calculating the discharge control amount D to draw the application line having the line width desired by the operator. Furthermore, the dispense controller 40 outputs the discharge control command including the calculated discharge control amount D to the discharge driver 64, and controls the discharge driver 64 to be operated just corresponding to the discharge control amount D. As a result, the liquid material can be discharged from the dispense head 50 in the discharge amount per unit time desired by the operator. The relative moving speed V is a scalar quantity of the relative moving speed between the dispense head 50 and the worktable 25.

The relative moving speed V between the dispense head 50 and the worktable 25 in the first mode discharge control is now described with reference to FIG. 4. An upper zone in FIG. 4 represents an image of the conversion table indicating discharge control amount $D_1$ to $D_n$ of the discharge driver 64 corresponding to relative moving speeds $V_1$ to $V_n$ of the dispense head 50, respectively. Because the relative moving speeds $V_1$ to $V_n$ are described in scalar quantities (absolute values), the same conversion table can be used in both an acceleration state and a deceleration state. A lower zone in FIG. 4 represents a graph indicating the discharge control amount D when the moving speed of the dispense head 50 is slowed down from $V_1$ to $V_n$. The following description is made, by way of example, on the assumption that the dispense head 50 and the dispense controller 40 are adapted for the plunger type, that the discharge driver 64 is the discharge motor for advancing and retracting the plunger, that the discharge control amount D of the discharge driver 64 is the number of rotations of the discharge motor per unit time, and that the discharge amount of the liquid material discharged from the dispense head 50 is controlled by controlling the number of rotations of the discharge motor per unit time (i.e., the discharge control amount D).

In an initial state (until time ti) in FIG. 4, the dispense head 50 is moved at the relative moving speed $V_1$, and the discharge motor serving as the discharge driver 64 is controlled at the number D1 of rotations per unit time. The relative moving speed V of the dispense head 50 is sent from the robot controller 30 to the dispense controller 40 per Δt. When the relative moving speed V is changed, the dispense controller 40 performs the conversion to obtain the discharge control amount D corresponding to the received relative moving speed V in accordance with the conversion table.

When the relative moving speed V of the dispense head 50 is reduced to $V_2$, a deceleration command is output from the dispense controller 40, and the number of rotations of the discharge driver 64 per unit time is reduced to $D_2$. Likewise, when the relative moving speed V is successively reduced to $V_3, V_4, \ldots V_n$, deceleration commands are also successively output from the dispense controller 40, and the discharge driver 64 successively reduces the number of rotations per unit time to $D_3, D_4, \ldots D_n$ in a corresponding relation. Furthermore, when the relative moving speed V of the dispense head 50 reaches $V_n$ and is maintained there, the discharge driver 64 maintains the number of rotations per unit time at $D_n$ because a speed change command is not output from the dispense controller 40.

While the lower zone in FIG. 4 represents, by way of example, the case in which the relative moving speed V of the dispense head 50 is linearly reduced, the discharge driver 64 can be controlled in a similar manner to that described above even in the case in which the relative moving speed V is non-linearly changed. Thus, the control may be performed by selecting the discharge control amount D corresponding to the relative moving speed V of the dispense head 50 from the conversion table, and by controlling the discharge driver 64 in accordance with the selected discharge control amount D.

The relational expression and the conversion table may be used in such a combined manner, by way of example, that the conversion table is used for a certain speed range and the relational expression is used outside the certain speed range. The relational expression or the conversion table needs to be prepared in advance on the basis of theoretical values or experimental values. The relational expression or the conversion table is preferably defined by determining five or more different discharge amounts step by step. Moreover, the relative moving speed V of the dispense head 50 is transmitted from the robot controller 30 to the dispense controller 40 continuously during the interpolation movement, or at the timing at which change of the relative moving speed V is instructed in the application program, or at predetermined time intervals. Alternatively, the dispense controller 40 may obtain the relative moving speed V by a polling method of issuing a transmission request from the dispense controller 40 to the robot controller 30.

<Second Mode Discharge Control>

The second mode discharge control is a discharge control mode in which the dispense head 50 is instructed to discharge the liquid material in the predetermined discharge amount per unit time regardless of the relative moving speed V between the dispense head 50 and the worktable 25. The operator can previously determine the discharge control amount D corresponding to the discharge amount per unit time desired in the second mode discharge control by experiments, for example, and can set the determined discharge control amount D in the discharge control program. When the second mode discharge control is set, the dispense controller 40 can discharge the liquid material in the discharge amount per unit time desired by the operator in the second mode discharge control by causing the discharge driver 64 to be operated just corresponding to the discharge control amount D in the second mode discharge control in accordance with the discharge control program.

<Application Works>

The application apparatus 1 automatically and continuously carries out a series of application works by executing the preset application program. A series of application works of alternately performing the line drawing application for a predetermined application pattern having corner portions illustrated in FIG. 6 and a dumping application will be described below as an example of the series of application works carried out by the application apparatus 1. In this example of the series of application works, the dumping application of discharging a predetermined amount of the liquid material to be discarded into the dumping discharge area 27 is first performed, and the line drawing application is then performed for the predetermined application pattern. Thereafter, the dumping application and the line drawing application for the predetermined application pattern are repeated continuously. The series of application works in combination of the dumping application and the line drawing application are described in the application program in this example. FIG. 6 is an illustration referenced to explain an application operation for the series of application works in which the line drawing application for the application pattern including the corner portions and the dumping application are performed alternately.

When carrying out the above-described application works, the robot controller 30 first outputs, to the dispense controller 40, a switch signal for switching to the second mode discharge control in accordance with the application program. In response, the dispense controller 40 switches over the discharge operation from the first mode discharge control to the second mode discharge control. Then, the robot controller 30 relatively moves the dispense head 50 to the dumping discharge area 27 in accordance with the application program. In the second mode discharge control, since the discharge amount per unit time is predetermined regardless of the relative moving speed V between the dispense head 50 and the worktable 25, the liquid material can be discharged in the discharge amount per unit time desired by the operator in the dumping discharge area 27 even when the dumping application is performed in a state that the dispense head 50 is kept stopped above the dumping discharge area 27.

By performing the dumping application as described above, the liquid material attached to an outer surface of the nozzle 54 and the liquid material solidified near the discharge port 55 can be discarded. As a result, the state and the discharge amount of the liquid material discharged from the nozzle 54 can be held constant, and the occurrence of an application failure can be reduced in the line drawing application performed after the dumping application.

After the end of the dumping application, the robot controller 30 outputs, to the dispense controller 40, a switch signal for switching from the second mode discharge control to the first mode discharge control in accordance with the application program. Thus, the dispense controller 40 comes into a state capable of determining the discharge amount per unit time depending on the relative moving speed V of the dispense head 50. Then, the robot controller 30 relatively moves the dispense head 50 along a locus of the predetermined application pattern and transmits, to the dispense controller 40, the speed signal corresponding to the relative moving speed V of the dispense head 50 in accordance with the application program. The dispense controller 40 calculates the relative moving speed V on the basis of the received speed signal, and calculates the discharge control amount D to operate the discharge driver 64 on the basis of the calculated relative moving speed V. Then, the calculated discharge control amount D is output from the dispense controller 40 to the discharge driver 64, and the discharge driver 64 is controlled to discharge the liquid material in the discharge unit 53 from the nozzle 54 in accordance with the discharge control amount D. Because the dispense controller 40 performs the application operation for the line drawing application in the first mode discharge control as described above, the line drawing application can be performed with the line width of the application line kept constant even when the predetermined application pattern has the corner portion and the relative moving speed V of the dispense head 50 is changed in the corner portion.

The series of application works carried out by the application apparatus 1 according to this embodiment will be described below with reference to FIGS. 6 to 8. The application apparatus 1 according to this embodiment starts the application works upon an application-work start button being pressed by the operator, and repeats a certain application operation automatically and continuously until the application works are ended in accordance with an instruction from the application program, or until an application-work end button is pressed by the operator. Thus, the application apparatus 1 is able to apply the liquid material onto a plurality of workpieces 26. The term "series of application works" used here means the application works described in the application program. When the application works are targeted for one workpiece, the series of application works means the line drawing application and the dumping application that are set for the one workpiece. When the application works are targeted for a plurality of workpieces, the series of application works means the line drawing application and the dumping application that are set for the plurality of workpieces. The workpiece 26, i.e., an application object, is not limited to particular one, and the workpiece may be, for example, one or more semiconductor chips, one or more substrates each including one semiconductor chip mounted thereto, or one or more substrates each including a plurality of semiconductor chips mounted thereto.

Example 1

First, the series of application works illustrated in FIG. 6 is described. In the series of application works illustrated in FIG. 6, the line drawing application of drawing a predetermined application pattern on the workpiece 26 and the dumping application of discarding the liquid material into the dumping discharge area 27 are performed alternately. Prior to starting the series of application works, the operator initially sets (programs), in the dispense controller 40, the discharge amount per unit time in a square application pattern illustrated in FIG. 6 and the discharge amount per unit time in the dumping discharge area 27.

The line drawing application for the square application pattern is performed in the first mode discharge control. The operator can set the first mode discharge control, by way of example, as follows. The operator repeatedly adjusts the discharge control amount D such that the line width of the application line becomes a desired line width Wa at a desired relative moving speed Va of the dispense head 50 in the line drawing application, thus determining a discharge control amount Da at which the line width of the application line becomes Wa. Next, the operator repeatedly adjusts the discharge control amount D such that the line width of the application line becomes the desired line width Wa at a relative moving speed Vb different from the relative moving speed Va, thus determining a discharge control amount Db at which the line width of the application line becomes Wa. Then, the operator inputs the determined relative moving speeds Va and Vb and the discharge control amounts Da and Db into the dispense controller 40. On the basis of those inputs, the dispense controller 40 calculates a linear function representing a relation between the relative moving speed V and the discharge control amount D in which relation the line width of the application line becomes Wa. The dispense controller 40 stores the calculated linear function into the storage device.

The above example has been described in connection with the configuration in which, upon the operator inputting the relative moving speeds Va and Vb and the discharge control amounts Da and Db into the dispense controller 40, the dispense controller 40 calculates the linear function representing the relation between the relative moving speed V and the discharge control amount D, the relation corresponding to the line width Wa of the application line desired by the operator. However, the present invention is not limited to that configuration. In another configuration, the operator may calculate the linear function representing the relation between the relative moving speed V and the discharge control amount D, the relation corresponding to the desired line width Wa of the application line, on the basis of the relative moving speeds Va and Vb and the discharge control amounts Da and Db, and may store the calculated linear function into the dispense controller 40.

Furthermore, when the relation between the relative moving speed V and the discharge control amount D in the first mode discharge control is set into the dispense controller 40, it is preferable that one of the relative moving speeds Va and Vb is set to a value higher than an actual maximum speed in the line drawing application for the application pattern, and that the other is set to a value lower than an actual minimum speed. With such setting, an error is less apt to generate between a line width W of the application line desired by the operator and a line width of the application line drawn actually. Moreover, by determining the relation between the relative moving speed V and the discharge control amount D in the first mode discharge control outside a range of the relative moving speed V at which the application pattern is actually drawn by the line drawing application, the relative moving speed and the discharge control amount determined from the above-described relation to draw the application line in the line width desired by the operator can be effectively prevented from departing from operation ranges of the dispenser 10 and the robot 20 when the application works are performed actually.

In addition, when it is previously known that the discharge control amount D is zero ($D_0$) at the relative moving speed V being zero ($V_0$), the above-described relation can be calculated by determining only one combination of the relative moving speed Va and the discharge control amount Da at which the application line can be drawn in the line width desired by the operator, and by using the combinations of the relative moving speeds $V_0$ and Va and the discharge control amounts $D_0$ and Da. Also in such a case, the relative moving speed Va is preferably set to a value higher than the actual maximum speed at which the application pattern is actually drawn by the line drawing application, as described above. The relation between the relative moving speed V and the discharge control amount D in the first mode discharge control can also be defined using a function other than the linear function, and can also be determined by a method other than the above-described method.

The discharge operation in the dumping discharge area 27 is performed in the second mode discharge control in which the discharge is carried out regardless of the relative moving speed V. The discharge control amount D in the second mode discharge control can be set to a discharge control amount Dc per unit time, which corresponds to the discharge amount desired by the operator in the dumping application.

Then, the operator performs setting of the robot controller 30. More specifically, the operator sets an application program to be stored in the robot controller 30. The application program describes mainly the commands regarding the PTP movement, the interpolation movement, the on/off switching of the discharge, the switching between the first mode discharge control and the second mode discharge control, etc. such that a series of desired application works can be performed. Regarding the interpolation movement, the relative moving speed V is also set together. It is to be noted that the setting of the dispense controller 40 and the setting of the robot controller 30 may be performed in no particular order, or may be performed at the same time.

The operation of the application apparatus 1 in the series of application works illustrated in FIG. 6 will be described below. To perform the dumping application, the robot controller 30 transmits, to the dispense controller 40, the switch signal for switching to the second mode discharge control. In response, discharge control executed by the dispense controller 40 is set to the second mode discharge control in which the liquid material is discharged in the predetermined discharge amount regardless of the relative moving speed V. Then, the robot controller 30 relatively moves the dispense head 50 to the dumping discharge area 27 with the PTP movement. When the dispense head 50 has been moved to the dumping discharge area 27, the robot controller 30 transmits the discharge start command to the dispense controller 40. In response to the discharge start command, the dispense controller 40 operates the discharge driver 64 in accordance with the preset discharge control amount Dc in the second mode discharge control, and controls the dispense head 50 to discharge the liquid material in the discharge amount per unit time, which is needed in the dumping application.

After the end of the dumping application, in order to perform the line drawing application for the square application pattern as illustrated in FIG. 6, the robot controller 30 transmits, to the dispense controller 40, the switch signal for switching from the second mode discharge control to the first mode discharge control in accordance with the application program. Thus, the discharge control executed by the dispense controller 40 is set to the first mode discharge control in which the discharge control amount D is determined depending on the relative moving speed V received from the robot controller 30.

The robot controller 30 relatively moves the dispense head 50 to a start point A of the application pattern, illustrated in FIG. 6, with the PTP movement in accordance with the application program. Then, the robot controller 30 moves the dispense head 50 and the worktable 25 relative to each other at the preset relative moving speed V in accordance with the application program, and transmits, to the dispense controller 40, the speed signal corresponding to the relative moving speed V.

The dispense controller 40 converts the speed signal received from the robot controller 30 to the relative moving speed V. On the basis of the previously-stored relation between the relative moving speed V and the discharge control amount D in the first mode discharge control, the dispense controller 40 calculates a discharge control amount $D_{cur}$ to draw the application line in the line width W desired by the operator on the basis of a current relative moving speed $V_{cur}$ between the dispense head 50 and the worktable 25. Then, the dispense controller 40 operates the discharge driver 64 in accordance with the calculated discharge control amount $D_{cur}$r, and controls the dispense head 50 to discharge the liquid material in the discharge amount per unit time, which is required in the line drawing application.

For the application pattern illustrated in FIG. 6, the line drawing application is performed in order of A-B-C-D-E-F-G-H-I-A.

Therefore, the robot controller 30 moves the dispense head 50 with the interpolation movement in the order of A-B-C-D-E-F-G-H-I-A. In this case, the robot controller 30 controls the relative moving speed V between the dispense head 50 and the worktable 25 such that the line width W of the application line does not vary in the corner portion of the application pattern.

In more detail, the robot controller 30 speeds up the dispense head 50 at an acceleration $VA_1$ from the application start point A toward a point B until the relative moving speed reaches $V_1$. When the relative moving speed reaches $V_1$, the robot controller 30 relatively moves the dispense head 50 along a remaining linear line between A and B at the relative moving speed $V_1$, thereby performing the line drawing application. When the dispense head 50 reaches the point B, the robot controller 30 slows down the dispense head 50 at a deceleration $VA_2$ in a corner portion BC until the relative moving speed reaches $V_2$. When the relative moving speed reaches $V_2$, the robot controller 30 relatively moves the dispense head 50 in remaining part of the corner portion BC at the relative moving speed $V_2$, thereby performing the line drawing application. Furthermore, when the dispense head 50 reaches a point C, the robot controller 30 speeds up the dispense head 50 at the acceleration $VA_1$ along a linear line CD such that the relative moving speed becomes $V_1$. When the relative moving speed reaches $V_1$, the robot controller 30 relatively moves the dispense head 50 along a remaining part of the linear line CD at the relative moving speed $V_1$, thereby performing the line drawing application. In other corner portions DE, FG, and HI and other linear portions EF, GH, and IA, the application operation is performed in a similar manner.

During the interpolation movement (during at least a period in which the application pattern is drawn with the line drawing application), the speed signal (pulse signal) corresponding to the current relative moving speed $V_{cur}$ is continuously output from the robot controller 30 to the dispense controller 40 in a repeated manner. Accordingly, in the example illustrated in FIG. 6, the robot controller 30 can continuously output the speed signal corresponding to the current relative moving speed $V_{cur}$ during the period in which the application pattern is drawn with the line drawing application. Furthermore, when the relative moving speed $V_{cur}$ of the dispense head 50 is changed near the corner portion, the robot controller 30 can output, to the dispense controller 40, the speed signal corresponding to the actual relative moving speed $V_{cur}$ near the corner portion. Then, the dispense controller 40 calculates, on the basis of the received speed signal, a discharge control amount $D_{cur}$ corresponding to the current relative moving speed $V_{cur}$ from the relation between the relative moving speed V and the discharge control amount D in the first mode discharge control, the relation being stored in the dispense controller 40, at timing appropriate for the dispense controller 40. Thus, even when the relative moving speed $V_{cur}$ of the dispense head 50 is changed near the corner portion, the dispense controller 40 can promptly calculate the discharge control amount $D_{cur}$ corresponding to the actual relative moving speed $V_{cur}$ near the corner portion at the timing appropriate for the dispense controller 40, and can control the dispenser 10 to promptly discharge the liquid material in the discharge amount corresponding to the actual relative moving speed $V_{cur}$ near the corner portion at timing appropriate for the dispense controller 40. As a result, the dispenser 10 can be controlled so as to discharge the liquid material in the discharge amount providing the desired line width W not only in the case in which the dispense head 50 is moved at a constant speed, but also in the case in which it is sped up or slowed down.

When the dispense head 50 reaches the application end point A, the dispense head 50 is stopped, and the discharge operation in the first mode discharge control is brought to an end. Then, the robot controller 30 transmits, to the dispense controller 40, the switch signal for switching to the second mode discharge control, and relatively moves the dispense head 50 to the dumping discharge area 27 with the PTP movement. Thereafter, the dumping application and the line drawing application are repeated in a similar manner.

Instead of relatively moving the dispense head 50 at the relative moving speed V as per set by the operator in the application program, the robot controller 30 may relatively move the dispense head 50 at a relative moving speed V that is different from the relative moving speed V set by the operator in the application program, and that is optimized from the viewpoint of safety and working efficiency. More specifically, the robot controller 30 can automatically set, in addition to the relative moving speed set by the operator in the application program, an acceleration at the start of the application works and a deceleration at the end of the application works. Furthermore, the robot controller 30 can set, in addition to the relative moving speed set by the operator in the application program, the acceleration $VA_1$ and the deceleration $VA_2$ between the linear portion and the corner portion of the application pattern by automatically calculating those acceleration and deceleration from a difference in the relative moving speed V set by the operator around a position before the corner portion and a position after the corner portion. Moreover, the robot controller 30 can optimize (correct) the relative moving speed V, which has been set by the operator, such that the dispense head 50 is smoothly moved along a path of the application pattern. When the robot controller 30 automatically makes correction or additional setting on the relative moving speed V and the acceleration VA described by the operator in the application program as mentioned above, it is preferable to instruct the robot controller 30 to output the speed signal corresponding to the relative moving speed V at which the robot controller 30 actually relatively moves the dispense head 50, instead of outputting the speed signal corresponding to the relative moving speed set by the operator in the application program.

With the series of application works illustrated in FIG. 6, since the first mode discharge control and the second mode discharge control can be switched over during the series of application works, the liquid material can be discharged in a state in which the dispense head 50 is stopped during the series of application works. Therefore, even when the dumping discharge area 27 has a relatively small space, the dumping application can be performed during the discharge work. Moreover, because the discharge work can be shifted from the dumping application to the line drawing application in a continuous way, the line drawing application can be performed with the nozzle 54 kept in a satisfactory state after the dumping application, and a failure incidence can be reduced.

The acceleration $VA_1$ and the deceleration $VA_2$ may be the same value (scalar quantity) or different values. Because situations are difference between each of an application start zone and an application end zone and the corner portion, the acceleration and the deceleration may bet set to different values therebetween. Furthermore, instead of performing the dumping application, trial application may be performed by arranging a meter for measuring discharge and application states, such as a weighing device, in the dumping discharge area 27, with intent to measure the discharge amount of the discharged liquid material for the purpose of issuing an alarm, or performing feedback control.

Example 2

The operation of the application apparatus 1 in a series of application works illustrated in FIG. 7 will be described below. In the series of application works illustrated in FIG. 7, a linear portion JK in a square application pattern illustrated in FIG. 7 is drawn in a larger line width than the other portions. Furthermore, in the series of application works illustrated in FIG. 7, the dumping application is not performed, and the application operation for the square application pattern illustrated in FIG. 7 is repeated continuously. In the following, the series of application works illustrated in FIG. 7 is described mainly about points different from the series of application works illustrated in FIG. 6.

In the series of application works illustrated in FIG. 7, because the linear portion JK does not include the corner portion, the dispense head 50 can be relatively moved at the constant relative moving speed V in the linear portion JK. Accordingly, the operator sets the application program for the robot controller 30 so as to perform, in the linear portion JK, the second mode discharge control in which the liquid material is discharged in the predetermined discharge amount regardless of the relative moving speed V. Furthermore, the operator previously determines, by experiments, for example, a discharge control amount $D_{jk}$ corresponding to the discharge amount per unit time with which the application line having a desired line width MK can be drawn in the linear portion JK at a scheduled relative moving speed $V_{jk}$ of the dispense head 50, and sets, in the dispense controller 40, the determined amount as the discharge control amount $D_{jk}$ per unit time in the second mode discharge control. Regarding the other portions of the application pattern than the linear portion JK, the robot controller 30 and the dispense controller 40 can be set in a similar manner to that in the application works for the application pattern illustrated in FIG. 6.

The series of application works illustrated in FIG. 7 will be described below. Also in the series of application works illustrated in FIG. 7, in a region from the application start point A to a point J, the dispense head 50 is relatively moved and the first mode discharge control in which the discharge control amount D per unit time is determined depending on the relative moving speed V of the dispense head 50 is performed as in the case of the application pattern illustrated in FIG. 6.

When the dispense head 50 reaches the point J, the robot controller 30 outputs, to the dispense controller 40, the switch signal for switching to the second mode discharge control in accordance with the application program. In response, the dispense controller 40 is set to the second mode discharge control in which the discharge control amount $D_{jk}$ corresponding to the discharge amount per unit time is output regardless of the relative moving speed V of the dispense head 50. Furthermore, the robot controller 30 relatively moves the dispense head 50 at the relative moving speed $V_JK$ in the linear portion JK in accordance with the application program. Since, as described above, the discharge control amount $D_{jk}$ is the control amount at which the line width of the application line becomes the line width MK desired by the operator in the linear portion JK when the dispense head 50 is moved at the relative moving speed $V_{JK}$, the application apparatus 1 is able to draw the linear portion JK in the line width $W_{JK}$ desired by the operator.

Thereafter, when the dispense head 50 reaches a point K, the robot controller 30 outputs, to the dispense controller 40, the switch signal for switching to the first mode discharge control in accordance with the application program. In response, the dispense controller 40 is set to the first mode discharge control in which the discharge control amount D is determined depending on the relative moving speed V of the dispense head 50. As a result, in the other portions of the application pattern than the linear portion JK, the dispense controller 40 can control the discharge control amount D depending on the relative moving speed V of the dispense head 50 such that the liquid material is discharged in the discharge amount providing the line width W desired by the operator even when the relative moving speed V of the dispense head 50 is changed.

When the line width is changed in part of the linear portion in the series of application works as illustrated in FIG. 7, linear lines having different line widths can be drawn by a continuous application operation by switching over the first mode discharge control and the second mode discharge control during the series of application works. Furthermore, by performing the second mode discharge control in the portion where the relative moving speed V is not changed as in the case illustrated in FIG. 7, time and effort required for the operator to set the discharge control program can be reduced because of no necessity of determining the relation between the relative moving speed V and the discharge control amount D for the above portion. Moreover, since the first mode discharge control and the second mode discharge control are automatically switched over in accordance with the application program, the linear portions EJ and JK different in width from each other and the linear portions JK and KF different in width from each other can be continuously drawn without interruption.

In the example illustrated in FIG. 7, the relative moving speed V of the dispense head 50 may be changed or kept constant between in a region where the first mode discharge control is performed and in a region where the second mode discharge control is performed. The present invention is not limited to the case of setting the line width of the application line in the linear portion JK to be larger than that in the other portions, and the line width of the application line in the linear portion JK may be set smaller than or equal to that in the other portions.

Example 3

A series of application works illustrated in FIG. 8 will be described below. In the series of application works illustrated in FIG. 8, the line drawing application for a square application pattern and the spot application for a spot pattern made up of three spots are performed alternately without performing the dumping application.

In the series of application works illustrated in FIG. 8, the discharge control in the line drawing application for the square application pattern is performed in accordance with the first mode discharge control, and the discharge control in the spot application is performed in accordance with the second mode discharge control. Thus, the operator can set the application program for the robot controller 30 such that the discharge control in the line drawing application for the square application pattern is performed in accordance with the first mode discharge control, and that the discharge control in the spot application is performed in accordance with the second mode discharge control. Here, since the square application pattern is similar to the application pattern illustrated in FIG. 6, the operator can set the robot controller 30 and the dispense controller 40 for the first mode discharge control as in Example 1. For the second mode discharge control, the operator can previously determine, by experiments, for example, the discharge control amount D at which the liquid material is discharged in the discharge amount required in the spot application, and can set the determined discharge control amount D in the dispense controller 40.

In the series of application works illustrated in FIG. 8, the robot controller 30 and the dispense controller 40 perform the line drawing application for the square application pattern in accordance with the first mode discharge control as in the case of the line drawing application for the application pattern illustrated in FIG. 6. After the end of the line drawing application for the square application pattern, the robot controller 30 outputs, to the dispense controller 40, the switch signal for switching to the second mode discharge control in accordance with the application program. In response, the discharge control executed by the dispense controller 40 is changed to the second mode discharge control. Then, the robot controller 30 relatively moves the dispense head 50 to a position above the point J with the PTP movement, and after stopping the dispense head 50 above the point J, transmits the discharge start command to the dispense controller 40. Thus, the dispense controller 40 can operate the discharge driver 64 in accordance with the discharge control amount D previously set for the second mode discharge control in a state in which the dispense head 50 is stopped above the point J, and can control the dispense head 50 to discharge the liquid material in the discharge amount per unit time desired by the operator. The robot controller 30 and the dispense controller 40 perform the spot application for the other points K and L in a similar manner. After the end of the spot application for the points K and L, the robot controller 30 relatively moves the dispense head to the point A with the PTP movement, and transmits, to the dispense controller 40, the switch signal for switching to the first mode discharge control. Thus, the discharge control executed by the dispense controller 40 is switched over to the first mode discharge control. Thereafter, the line drawing application for the predetermined application pattern and the spot application are continuously performed in a repeated manner.

Regarding the series of application works in which the line drawing application for the predetermined application pattern including the corner portions and the spot application are alternately performed as illustrated in FIG. 8, it is possible to automatically and continuously perform the series of application works in which the line drawing application for the predetermined application pattern including the corner portions and the spot application are alternately performed as illustrated in FIG. 8, by automatically switching over the discharge control mode such that the line drawing application is performed in accordance with the first mode discharge control, and that the spot application is performed in accordance with the second mode discharge control.

Example 4

The operation of the application apparatus 1 in a series of application works illustrated in FIG. 9 will be described below. In the series of application works illustrated in FIG. 9, the dumping application, the line drawing application for a first application pattern P1, the dumping application, and the line drawing application for a second application pattern P2 are successively performed in a repeated manner. As illustrated in FIG. 9, the application patterns P1 and P2 are each an application pattern including corner portions, but a line width of an application line in the second application pattern P2 is larger than that in the first application pattern P1.

Here, the application apparatus 1 according to the embodiment can set, as the first mode discharge control, plural types of discharge control different in discharge conditions. Similarly, the application apparatus 1 can set, as the second mode discharge control, plural types of discharge control different in discharge conditions. In an example illustrated in FIG. 9, the operator can set, in the dispense controller 40, first mode discharge control X1 in which a relation between the relative moving speed V and the discharge control amount D, the relation providing a line width W1 of the application line in the line drawing application, is denoted by $R_{W1}$, and first mode discharge control X2 in which a relation between the relative moving speed V and the discharge control amount D, the relation providing a line width W2 of the application line in the line drawing application, is denoted by $R_{W2}$.

Furthermore, in the application apparatus 1 according to the embodiment, when the first mode discharge control and the second mode discharge control are each set as the plural types of discharge control different in discharge conditions, a combination of any one of the plural types of the first mode discharge control and any one of the plural types of the second mode discharge control can be set as a channel. For instance, when X1 and X2 are set as the first mode discharge control and Y1 and Y2 are set as the second mode discharge control, it is possible to set a combination of the first mode discharge control X1 and the second mode discharge control Y1 as a channel C1, and a combination of the first mode discharge control X2 and the second mode discharge control Y2 as a channel C2. In this case, by setting an application program so as to repeatedly execute the channel C1 and the channel C2, the application apparatus 1 can successively perform the first mode discharge control X1, the second mode discharge control Y1, the first mode discharge control X2, and the second mode discharge control Y2 in a repeated manner. It is to be noted that, in the application apparatus 1, only one of the first mode discharge control and the second mode discharge control may be set in plural types. Setting of the channels is also not limited to particular one. For instance, the discharge control in the same mode may be set in plural channels as in the case of setting the combination of the first mode discharge control X1 and the second mode discharge control Y1 as the channel C1, and setting a combination of the first mode discharge control X2 and the second mode discharge control Y1 as the channel C2.

Alternatively, the discharge control in the same mode may be set in plural number in one channel.

In the series of application works illustrated in FIG. 9, the dumping application, the line drawing application for the first application pattern P1 with the application line having the line width W1, the dumping application, and the line drawing application for the second application pattern P2 with the application line having the line width W2 (W2>W1) are successively performed in a repeated manner. In this case, the operator sets, in the dispense controller 40, a combination of the second mode discharge control Y1 performing the dumping application and the first mode discharge control X1 providing the application line in the line width W1 as the channel C1, and a combination of the second mode discharge control Y1 performing the dumping application and the first mode discharge control X2 providing the application line in the line width W2 as the channel C2. Moreover, the operator sets the application program, which is stored in the robot controller 30, to execute the discharge control of the channel C1 for the first application pattern P1, and to execute the discharge control of the channel C2 for the second application pattern P2.

In the above case, the robot controller 30 first transmits, in accordance with the application program, an instruction of performing the discharge control of the channel C1 to the dispense controller 40. Furthermore, in accordance with the application program, the robot controller 30 relatively moves the dispense head 50 to the dumping discharge area 27, and instructs the dispense controller 40 to perform the dumping application in the second mode discharge control Y1. Then, the robot controller 30 relatively moves the dispense head 50 to an application start point of the first application pattern P1, and instructs the dispense controller 40 to perform the line drawing application for the first application pattern P1 in the first mode discharge control X1. Since, in the first mode discharge control X1, the relation $R_{W1}$ between the relative moving speed V of the dispense head 50 and the discharge control amount D is set aiming at providing the line width W1 of the application line, the application apparatus 1 can perform the line drawing application to draw the application line in the line width W1 for the first application pattern P1.

After the end of the application for the first application pattern P1, the robot controller 30 transmits, in accordance with the application program, an instruction of performing the discharge control of the channel C2 to the dispense controller 40. Furthermore, in accordance with the application program, the robot controller 30 relatively moves the dispense head 50 to the dumping discharge area 27, and instructs the dispense controller 40 to perform the dumping application in the second mode discharge control Y1. Then, the robot controller 30 relatively moves the dispense head 50 to an application start point of the second application pattern P2, and instructs the dispense controller 40 to perform the line drawing application for the second application pattern P2 in the first mode discharge control X2. Since, in the first mode discharge control X2, the relation $R_{W2}$ between the relative moving speed V of the dispense head 50 and the discharge control amount D is set aiming at providing the line width W2 of the application line, the application apparatus 1 can perform the line drawing application to draw the application line in the line width W2 for the second application pattern P2.

The relative moving speed V of the dispense head 50 may be the same or different between the first application pattern P1 and the second application pattern P2. In the example illustrated in FIG. 9, the second mode discharge control Y1 in the dumping application may be described in only one of the channel C1 and the channel C2, and the second mode discharge control Y1 may be performed in the other channel by referring to the channel in which the second mode discharge control Y1 is described.

Thus, in the application apparatus 1 according to Example 4, since the first mode discharge control and the second mode discharge control can be each set in plural types different in discharge conditions, a series of application works can be performed in combinations of plural application patterns having different line widths, plural dumping applications in different discharge amounts, and so on.

With the embodiment according to the present invention, as described above, the first mode discharge control of changing the discharge amount of the liquid material, which is discharged from the dispense head 50 per unit time, depending on the relative moving speed V between the dispense head 50 and the worktable 25, and the second mode discharge control of operating the dispense head 50 to discharge the liquid material in the predetermined discharge amount per unit time regardless of the relative moving speed V can be switched over during a series of the application works performed in accordance with the application program. As a result, it is possible to automatically and continuously perform application works that have been impracticable in the past, such as the series of the application works in which the line drawing application for the predetermined application pattern having the corner portions and the dumping application are repeated, the series of the application works in which the application line is drawn in a different line width in part of the linear portion during the line drawing application for the predetermined application pattern having the corner portions, the series of the application works in which the line drawing application for the predetermined application pattern having the corner portions and the spot application are repeated, and the series of the application works in which the line drawing applications for a plurality of application patterns having different line widths are performed, as illustrated in FIGS. 6 to 8.

While the preferred examples of the present invention have been described above, the technical scope of the present invention is not limited to the above examples. The above examples can be variously modified or improved, and the modified or improved versions are also included in the technical scope of the present invention.

For instance, while Example 1 illustrated in FIG. 6 has been described above in connection with the series of the application works in which the line drawing application for the predetermined application pattern and the dumping application are performed alternately, the present invention is not limited to that case. The series of the application works may be modified as follows, for example. After performing the line drawing application for the predetermined application pattern on a plurality of workpieces 26 a predetermined number of times, the dumping application is performed. Thereafter, similar steps of performing the line drawing application for the predetermined application pattern on the workpieces 26 the predetermined number of times, and then performing the dumping application are repeated. While, in Example 4 illustrated in FIG. 9, the dumping application, the line drawing application for the first application pattern P1, the dumping application, and the line drawing application for the second application pattern P2 are successively repeated, the series of the application works may be modified, for example, such that the dumping application, the line drawing application for the first application pattern P1, and the line drawing application for the second application pattern P2 are successively repeated. In another example, the application may be interrupted in the course of the line drawing application for the predetermined application pattern to perform the dumping application. In still another example, the dumping application may be performed at intervals of certain time. The frequency and the timing of performing the dumping application can be set as appropriate in the application program by the operator depending on the liquid material to be applied.

The timing of outputting the switch signal for the discharge control mode by the robot controller 30, and the timing of switching over the discharge mode control by the dispense controller 40, which has received the switch signal, are not limited to the above-described timings. The timings may be set to timings different from those described in the above examples insofar as no troubles occur in the discharge/application after change of the discharge control mode.

Furthermore, the above examples have been described, by way of example, in connection with the configuration in which the first mode discharge control of changing the discharge control amount D in conformity with change of the relative moving speed V is performed for the line drawing application for the application pattern having the corner portions. However, when the relative moving speed is changed in a portion other than the corner portion, the first mode discharge control may be performed in that portion. For instance, when the relative moving speed needs to be changed in the linear portion, the first mode discharge control may be performed even for such an application pattern as well.

Moreover, while, in the above example, the PTP movement and the interpolation movement are selectively performed from the viewpoint of increasing efficiency, the interpolation movement may be performed in part or the whole of the above-described PTP movement. While Examples 1 to 4 have been described in connection with the case of performing any one of the dumping application, the trial application, the line drawing application, and the spot application as the application in the second mode, plural types of applications may be performed as the application in the second mode in the series of application works. In addition, another type of application different from the above-described applications may be performed as the application in the second mode when the occasion requires.

LIST OF REFERENCE SIGNS

1: application apparatus
10: dispenser
20: robot
21: X-axis moving device
22: Y-axis moving device
23: head (Z-axis moving device)
24: base
25: workpiece holder (worktable)
26: workpiece
27: dumping discharge area (adjustment application area)
28: moving member
30: robot controller
31: storage device
32: computing device
40: dispense controller
50: dispense head
53: discharge unit
54: nozzle
55: discharge port
56: screw
57: plunger
58: plunger
59: valve
61: X-axis driving source
62: Y-axis driving source
63: Z-axis driving source
64: discharge driver
81, A1, A2, B: cable

The invention claimed is:

1. A liquid material application method using a liquid material application apparatus comprising:
a discharge head discharging a liquid material;
a robot moving the discharge head relative to a workpiece;
a movement control unit controlling relative movement of the discharge head and the workpiece in accordance with an application program; and
a discharge control unit controlling an operation of discharging the liquid material from the discharge head,
the movement control unit and the discharge control unit cooperatively performing work of applying the liquid material onto the workpiece in a predetermined application pattern,
wherein the liquid material application method comprises steps of:
preparing the movement control unit to be disposed on the robot, preparing the discharge control unit to be connected to the robot in a disconnectable manner, preparing the discharge head to be detachably attached to the robot, operating the movement control unit to execute interpolation movement in which the relative movement is performed along a predetermined movement path and Point-to-point (PTP) movement in which the relative movement is performed toward designated coordinates regardless of the predetermined movement path, and operating the movement control unit to continuously output, to the discharge control unit, a speed signal corresponding to a relative moving speed between the discharge head and the workpiece during the interpolation movement.

2. The liquid material application method according to claim 1, wherein the speed signal is a pulse signal with a period representing the magnitude of a speed.

3. The liquid material application method according to claim 1, wherein the robot and the discharge control unit are connected by a cable, and the speed signal is sent from the movement control unit to the discharge control unit via the cable.

4. The liquid material application method according to claim 1, wherein the relative moving speed includes a first relative moving speed previously input to the application program to apply the liquid material in the predetermined application pattern, and a second relative moving speed that is automatically calculated on the basis of the first relative moving speed previously input to the application program to complement an acceleration and a deceleration between a linear portion and a corner portion of the application pattern.

5. The liquid material application method according to claim 1, wherein the discharge control unit executes first mode discharge control of changing a discharge amount of the liquid material, which is discharged from the discharge head per unit time, depending on the relative moving speed.

6. The liquid material application method according to claim 5, wherein, in the first mode discharge control, the discharge amount of the liquid material from the discharge head per unit time is changed to perform a line drawing application of drawing an application line in a constant application amount per unit length.

7. The liquid material application method according to claim 5, wherein the discharge control unit selectively executes, instead of the first mode discharge control, second mode discharge control of operating the discharge head to discharge the liquid material in a predetermined discharge amount per unit time regardless of the relative moving speed.

8. The liquid material application method according to claim 7, wherein the discharge control unit switches over the first mode discharge control and the second mode discharge control upon receiving a signal output from the movement control unit in accordance with the application program.

9. The liquid material application method according to claim 1, wherein the discharge head is constituted by a plurality of discharge heads of different discharge types, one selected from the discharge heads being detachably attached to the robot, the discharge control unit is constituted by a plurality of discharge control units corresponding to the discharge heads of different discharge types, one of the discharge control units corresponding to the selected one discharge head being connected to the robot in a disconnectable manner, and the discharge control unit calculates a discharge control amount corresponding to the selected one discharge head in accordance with the speed signal received from the movement control unit, and outputs a discharge control command including the discharge control amount to the one discharge head.

10. The liquid material application method according to claim 9, wherein the different discharge types includes two or more discharge types selected from a screw type, a jet type, a plunger type, and an air type.

* * * * *